E. K. CONOVER.
WIND SCREEN.
APPLICATION FILED NOV. 26, 1907.
935,190.  Patented Sept. 28, 1909.
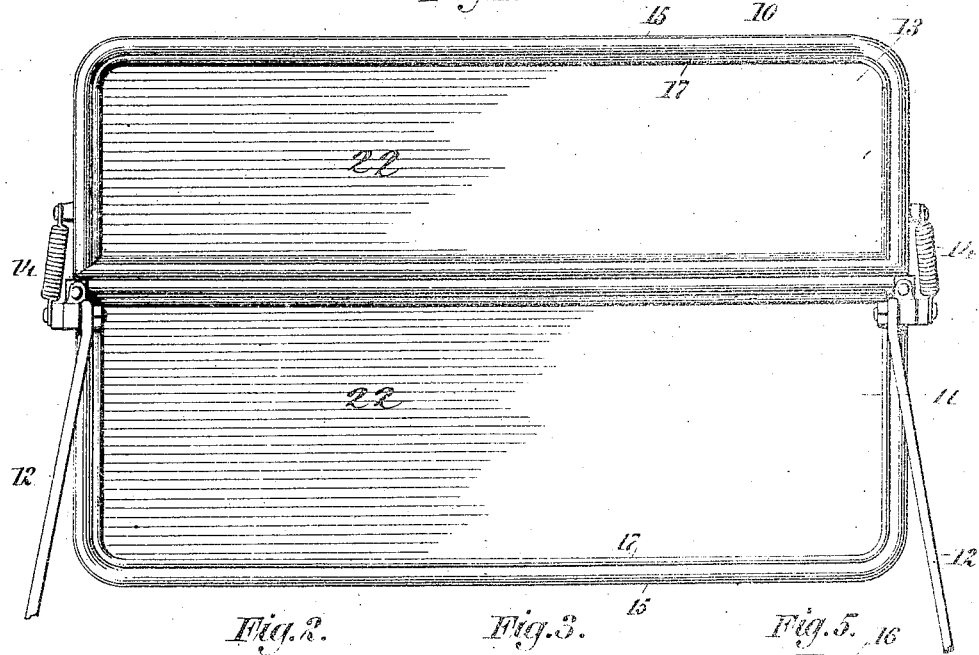
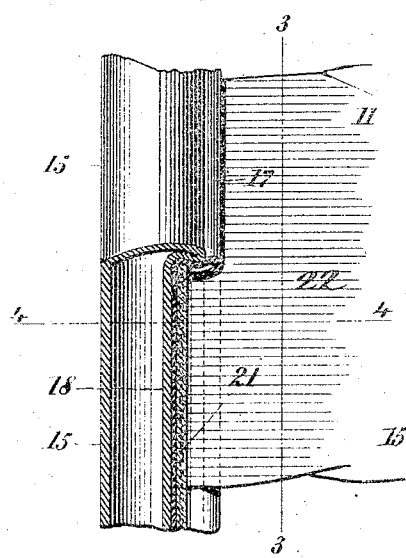
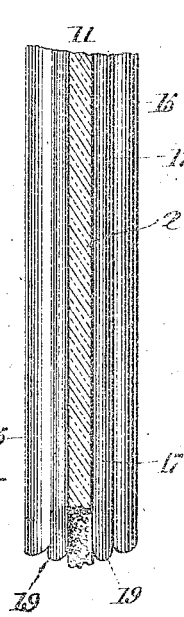
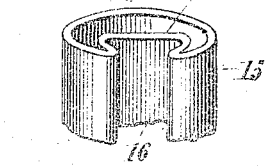
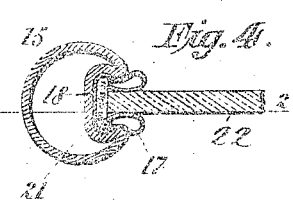
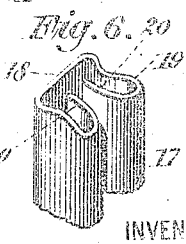
WITNESSES:
INVENTOR
Edwin K. Conover
BY Conrad A. Dieterich
his ATTORNEY

UNITED STATES PATENT OFFICE.

EDWIN K. CONOVER, OF PATERSON, NEW JERSEY, ASSIGNOR, BY MESNE ASSIGNMENTS TO C. A. MEZGER, INCORPORATED, OF BROOKLYN, NEW YORK, A CORPORATION OF NEW YORK.

WIND-SCREEN.

935,190.

Specification of Letters Patent. Patented Sept. 28, 1909.

Application filed November 26, 1907. Serial No. 403,857.

*To all whom it may concern:*

Be it known that I, EDWIN K. CONOVER, a citizen of the United States, residing at Paterson, Passaic county, in the State of New Jersey, have invented certain new and useful Improvements in Wind-Screens, of which the following is a full, clear, and exact specification.

My invention relates to improvements in wind screens or screens for motor vehicles and the same has for its object more particularly to provide a simple and efficient means for securing the transparent portion of a wind screen within its frame.

Further, said invention has for its object to provide a wind screen in which the transparent portion may be secured within the frame in such a manner as to prevent the rattling of the transparent section within its frame.

Further, said invention has for its object to provide a wind screen in which the transparent section may be secured within its frame without necessitating the use of packing or other material in order to hold the same firmly in place therein.

Further, said invention has for its object to provide a wind screen frame constructed in such a manner that the same will readily and easily accommodate transparent sections of different thicknesses without requiring any adjustment of the parts in order to receive and retain the same.

Further said invention has for its object to construct a wind screen frame in such a manner that the same will readily and easily accommodate transparent sections, the edges of which may be of uneven or varying thicknesses without requiring any adjustment of the part or parts for receiving and retaining said transparent section in position upon the frame.

To the attainment of the foregoing objects and ends my invention consists in the novel details of construction and in the combination, connection and arrangement of parts hereinafter more fully described and then pointed out in the claims.

In the accompanying drawings forming part of this specification wherein like numerals of reference indicate like parts, Figure 1 is a front view of a wind screen constructed according to and embodying my invention; Fig. 2 is an enlarged detail side view partly broken away, showing a portion of the frame and section of transparent material, and the means for securing the same in position within said frame; Fig. 3 is a detail section taken on the line 3—3 of Fig. 2; Fig. 4 is a detail horizontal section taken on the line 4—4 of Fig. 2; Fig. 5 is an enlarged detail perspective view showing one end or section of the frame with the receiving groove therein, and Fig. 6 is a detail perspective view showing the resilient member which is adapted to receive the edge of the transparent section, the same being shown detached from the frame.

In said drawings 10 designates a frame consisting of a lower section 11 which is adapted to be rigidly secured in position upon the dash board of a motor vehicle and braced in position thereon by the inclined stays 12, 12. Along the upper edge of the lower section 11 is pivotally secured an upper or folding frame section 13 which is provided with spring means 14 for holding said hinged section to either its raised or lowered vertical position upon said rigid section.

The frame portion of each section is composed of a cylindrical tube 15 which is provided upon its inner edge with a recess 16 co-extensive in length with the inner edge of said frame section. Within said recess 16 is disposed a resilient member or a spring clamp 17 having a flat base 18 from the opposite longitudinal edges of which extend upwardly and outwardly side members 19 19 having their extremities 20—20 again bent inwardly and downwardly and terminating at a point slightly above the base 18.

Upon the base 18 directly below the edges of the inwardly extending portions 20 20 of the side members 19, 19 is disposed a strip of felt 21 or other suitable elastic material which is retained in position within said resilient member by means of the parallel edges of the inwardly extending members 20 20. 22 denotes a transparent section preferably composed of glass, having its horizontal and vertical edges disposed intermediate and engaged by the inwardly extending members 20 20 of the resilient member 17 arranged upon the inner surface of the frame, and contacting with the felt cushion 21 therein.

It will, of course, be understood that both the vertical and horizontal portions of the frame sections 11 and 13 are provided with grooves to receive the resilient members 17 and that the upper edge of the lower frame section and the lower edge of the upper frame section are also recessed to receive such retaining member in order to hold the transparent section or glass duly and firmly in position within each frame section, and in such a manner as to prevent all vibration or rattling therein.

It will be further noted that in my improved construction the frame with its resilient member arranged therein is capable of receiving transparent sections or glasses of different thicknesses without requiring any adjustment of the retaining member, since the same yields sufficiently to accommodate the same, and that where a transparent section or glass has an edge of varying thickness the same will also firmly engage the same by reason of the yielding character of the opposing members 20 20 of said resilient member.

It will be understood that the frame sections 11 and 13 are made in sections or otherwise so divided that the glass plates and retaining strips may be easily introduced into the position shown.

Owing to the peculiar purpose to which this invention is put and to the use of a glass plate as the shield proper, it becomes necessary to cushion or yieldingly sustain the glass plate, not only against motion in the plane of the plate, but against lateral or vibratory motion of the plate. The construction which I have devised is well adapted for this purpose; the cushion 21 receives the edge of the glass plate and sustains the plate against motion in its plane while the return bent edges or side bearings 20 of the retaining strip engage the sides of the plate and take up the vibration or lateral motion thereof. It is this construction which adapts the device for use as an automobile wind screen and distinguishes it from prior organisms in non-analogous arts such as the windows of buildings. In an automobile wind screen there is a violent vibrating tendency which must be taken care of by devices such as the side bearings 20. At the same time there is a heavy movement of the glass plate in its plane which is taken care of by the cushion 21. On the other hand in a window there is, owing to the movement of the window in fixed guides, no appreciable vibrating action.

Having thus described my invention, what I claim and desire to secure by Letters Patent is:

1. A wind screen for motor vehicles having an inclosing frame formed with a groove along its inner side, said groove having its outer or entrance portion contracted relatively to the inner or base portion of the groove, a resilient metal retaining strip substantially U-shape in cross section sprung into said groove and having return bent side portions, a glass shield plate inclosed by said frame and retaining strip and having its edges received between the return bent sides of the retaining strip and a cushion seated in the retaining strip and engaged by the edge of the shield plate.

2. A wind screen for motor vehicles having an inclosing frame formed with a groove running along its inner side, a substantially U-shape metal retaining strip seated in said groove and having resilient return bent side portions, a glass shield plate, the edges of which are received between the return bent sides of the retaining strip, and a cushion seated in the retaining strip and engaged by the edge of the shield plate.

3. In a wind screen for motor vehicles, the combination of a tubular metal frame formed along its inner sides with an inwardly bent portion producing a groove in the integral frame, means to mount said frame in a substantially upright position on the motor vehicle, a retaining strip seated in said groove, a glass plate having its edge portions received in said retaining strip, the retaining strip being bent to embrace said edge portions of the glass and having resilient edges engaged with the side faces of the same, and a cushion held by the retaining strip and engaged by the edges of the glass.

4. In a wind screen for motor vehicles, the combination of a tubular metal frame formed along its inner sides with an inwardly bent portion producing a groove in the integral frame, means to mount said frame in a substantially upright position on the motor vehicle, a retaining strip seated in said groove, a glass plate having its edge portion received in said retaining strip, the retaining strip being bent to embrace said edge portions of the glass and having resilient edges turned back upon themselves and engaged with the side faces of the glass and the cushion held by the retaining strip and engaged by the edges of the glass.

Signed at the city of New York in the county and State of New York, this fourteenth day of November, nineteen hundred and seven.

EDWIN K. CONOVER.

Witnesses:
 CONRAD A. DIETERICH,
 LEON A. CARLEY.